US009066055B2

(12) United States Patent
McCartney

(10) Patent No.: US 9,066,055 B2
(45) Date of Patent: Jun. 23, 2015

(54) POWER SUPPLY ARCHITECTURES FOR TELEVISIONS AND OTHER POWERED DEVICES

(75) Inventor: Richard I. McCartney, Scotts Valley, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 91 days.

(21) Appl. No.: 13/560,749

(22) Filed: Jul. 27, 2012

(65) Prior Publication Data

US 2013/0182190 A1 Jul. 18, 2013

Related U.S. Application Data

(60) Provisional application No. 61/512,256, filed on Jul. 27, 2011.

(51) Int. Cl.
| | |
|---|---|
| H04N 7/16 | (2011.01) |
| H04N 5/63 | (2006.01) |
| H01B 11/00 | (2006.01) |
| H04B 3/54 | (2006.01) |
| H04N 7/10 | (2006.01) |
| H04L 12/28 | (2006.01) |

(52) U.S. Cl.
CPC ............... *H04N 5/63* (2013.01); *H01B 11/00* (2013.01); *H04B 3/54* (2013.01); *H04N 7/108* (2013.01); *H04L 12/2838* (2013.01); *H04L 2012/2843* (2013.01); *H04L 2012/2849* (2013.01); *H04B 2203/545* (2013.01)

(58) Field of Classification Search
CPC .............. H04B 3/44; H04H 20/78; H04N 7/10
USPC ............. 725/45, 52, 60, 61, 78, 79, 131–134, 725/139–142, 150; 307/85, 139; 340/538
See application file for complete search history.

(56) References Cited

U.S. PATENT DOCUMENTS

| | | | | | |
|---|---|---|---|---|---|
| 4,040,046 | A | * | 8/1977 | Long et al. | 340/870.02 |
| 4,316,262 | A | * | 2/1982 | Mizuta et al. | 713/502 |
| 5,089,771 | A | * | 2/1992 | Tanguay et al. | 324/142 |
| 5,994,892 | A | * | 11/1999 | Turino et al. | 324/142 |
| 6,288,632 | B1 | * | 9/2001 | Hoctor et al. | 375/130 |
| 7,388,945 | B2 | * | 6/2008 | Pythoud | 379/1.03 |
| 7,793,124 | B2 | * | 9/2010 | Landry et al. | 713/300 |

(Continued)

OTHER PUBLICATIONS

Charlie White, "Thunderbolt: Everything You Need to Know", Feb. 24, 2011, 2 pages.

(Continued)

*Primary Examiner* — Annan Shang
(74) *Attorney, Agent, or Firm* — Steven A. Shaw; Frank D. Cimino

(57) ABSTRACT

A method includes transporting audio/video data using at least one signal line in a cable. The method also includes concurrently transporting at least about 100 W of power for operating an audio/video device using at least one electrical conductor in the cable, the audio/video device coupled to the cable. The cable could include multiple electrical conductors, and the at least one signal line in the cable could include one or more of the electrical conductors in the cable. The data and the power can be transported using at least one common electrical conductor in the cable. The audio/video data could have a data rate of at least about 7 Gbps, and the power could be at least about 200 W of power.

20 Claims, 13 Drawing Sheets

(56) References Cited

U.S. PATENT DOCUMENTS

| | | | |
|---|---|---|---|
| 8,378,809 B2* | 2/2013 | Ulmer | 340/538 |
| 2005/0060107 A1* | 3/2005 | Rodenberg et al. | 702/62 |
| 2006/0209877 A1* | 9/2006 | Yamamoto | 370/452 |
| 2010/0181835 A1* | 7/2010 | Ulmer | 307/38 |
| 2011/0164364 A1* | 7/2011 | Baum | 361/679.02 |

OTHER PUBLICATIONS

"The Speed of the Future: USB 3.0—SuperSpeed USB", Jul. 24, 2012, 3 pages.
"Mobile High-Definition Link", Wikipedia.org, Jul. 22, 2012, 8 pages.
"HDBaseT", Wikipedia.org, Jul. 23, 2012, 2 pages.

* cited by examiner

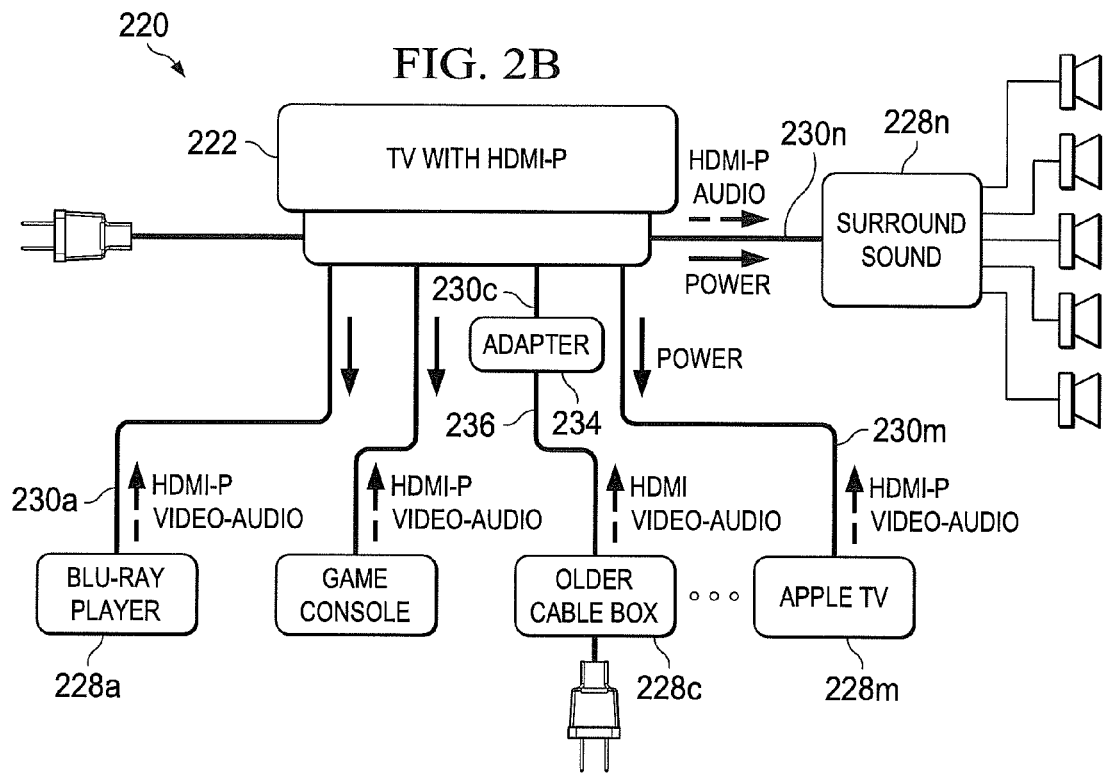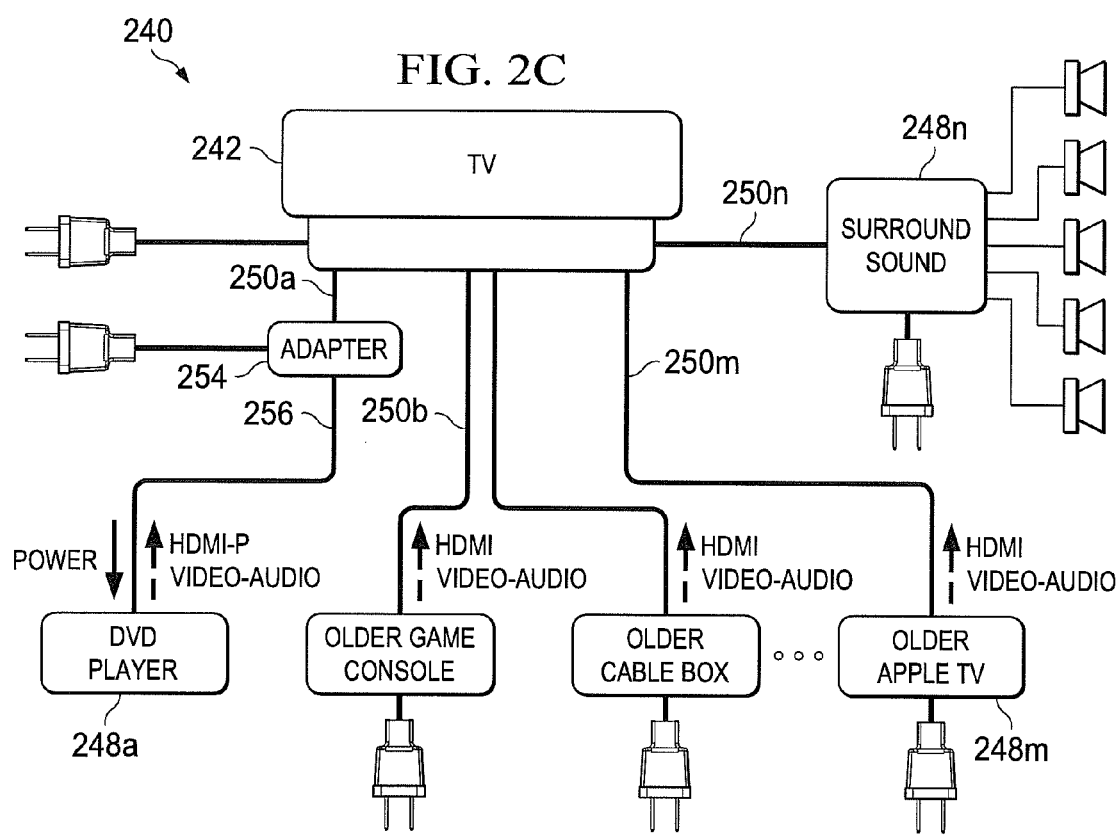

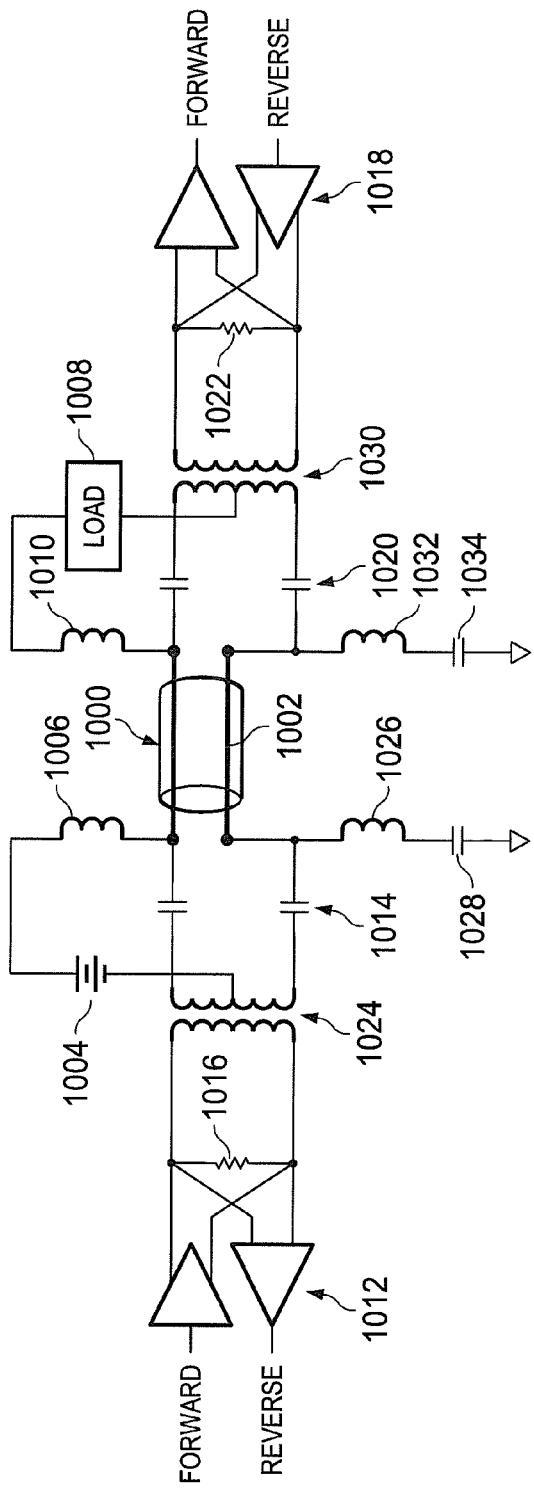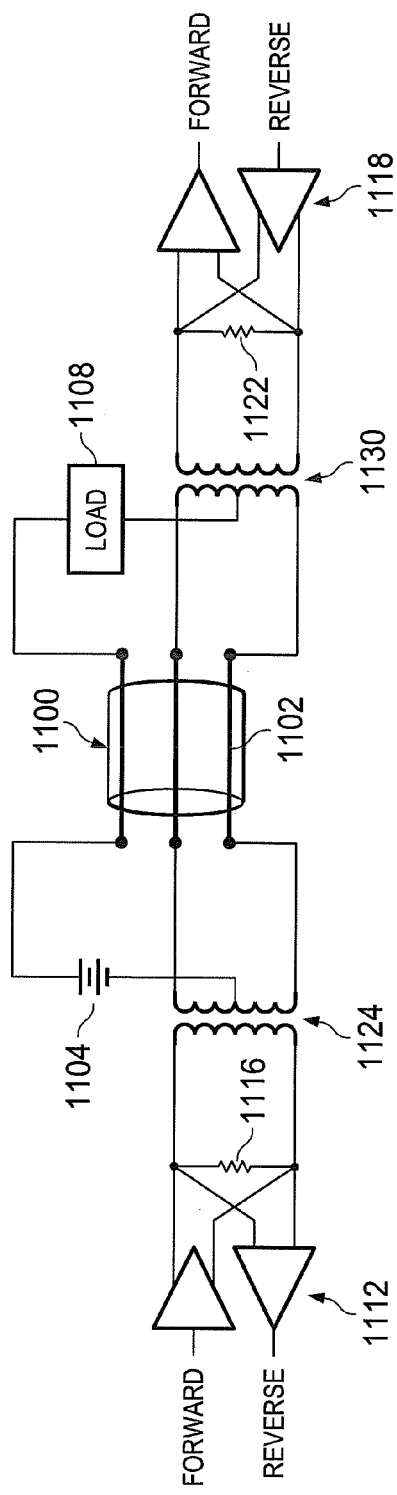

POWER SUPPLY ARCHITECTURES FOR TELEVISIONS AND OTHER POWERED DEVICES

CROSS-REFERENCE TO RELATED APPLICATION AND PRIORITY CLAIM

This application claims priority under 35 U.S.C. §119(e) to U.S. Provisional Patent Application No. 61/512,256 filed on Jul. 27, 2011, which is hereby incorporated by reference.

TECHNICAL FIELD

This disclosure relates generally to power supply architectures. More specifically, this disclosure relates to power supply architectures for televisions and other powered devices.

BACKGROUND

Ultra-thin televisions typically include a display unit and a base unit. The display unit typically mounts on a wall, over a fireplace, or in some other location. The display unit usually has minimal weight, minimal heat dissipation, and minimally conspicuous cabling. The base unit often sits in a floor cabinet, in a wiring closet, or at some other location that is out of sight. The base unit serves as a connection hub for High-Definition Multimedia Interface (HDMI), Digital Visual Interface (DVI), $YP_RP_B$ or component video interface, Video Graphics Array (VGA) interface, or other connections to the display unit. The base unit can be coupled to a wide variety of video or other sources that provide content to the display unit. These sources can include cable boxes, BLURRY or other DVD players, and game consoles. Other sources can include surround sound receivers, Internet access devices, or devices such as APPLE TV, GOOGLE TV, ROKU, SNOWFLAKE, and BOXEE units.

SUMMARY

This disclosure provides power supply architectures for televisions and other powered devices.

In a first embodiment, a method includes transporting audio/video data using at least one signal line in a cable. The method also includes concurrently transporting at least about 100 W of power for operating an audio/video device using at least one electrical conductor in the cable, the audio/video device coupled to the cable.

In a second embodiment, an apparatus includes a cable transceiver configured to transmit or receive audio/video data using at least one signal line in a cable. The apparatus also includes a voltage source configured to concurrently provide at least about 100 W of power for operating an audio/video device using at least one electrical conductor in the cable.

In a third embodiment, a cable includes at least one signal line configured to transport audio/video data over the cable. The cable also includes at least one electrical conductor configured to transport at least about 100 W of power for operating an audio/video device over the cable.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2C illustrate more specific example audio/video systems according to this disclosure;

FIGS. 8A through 20 illustrate example powering and powered devices along with cables supporting transport of power and audio/video data according to this disclosure.

DETAILED DESCRIPTION

FIGS. 1 through 23, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
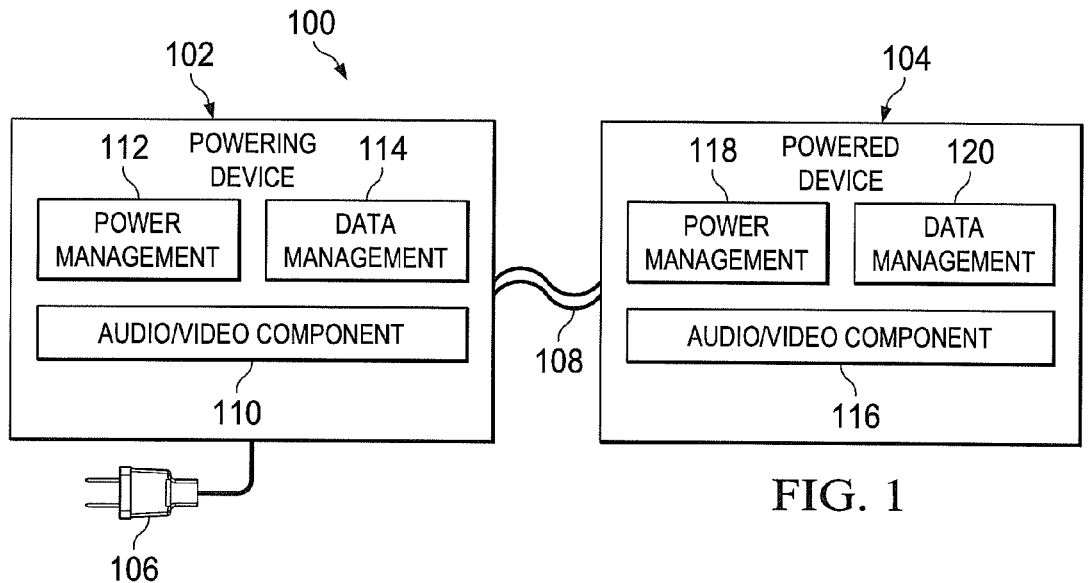
FIG. 1 illustrates an example audio/video system according to this disclosure.

FIG. 1 illustrates an example audio/video system 100 according to this disclosure. As shown in FIG. 1, the system 100 includes a powering device 102 and a powered device 104. In this document, a "powering device" denotes a device that provides power to at least one other device over at least one cable, while a "powered device" denotes a device that receives power from another device over a cable.

The powering device 102 here receives electrical power via an alternating current (AC) connector 106. The powered device 104 receives operating power from the powering device 102 over a cord or cable 108 (referred to here as a "cable"). The powered device 104 could be designed to obtain power via an AC connector or the cable 108, or the powered device 104 could be designed to obtain power only via the cable 108. As described below, the cable 108 transports both power and data concurrently within a single structure between the devices 102-104. For instance, the cable 108 could transport power, video signals, audio signals, and bi-directional control signals over the cable 108.

The powering device 102 includes any suitable structure providing one or more audio/video functions while providing power over a cable. The powered device 104 includes any suitable structure providing one or more audio/video functions while receiving power from a powering device over a cable. The AC connector 106 includes any suitable structure for coupling a device to an AC electrical line. The cable 108 includes any suitable structure for transporting power and data between audio/video devices. Example embodiments of the cable 108 are described below.

In this example, the powering device 102 includes at least one audio/video component 110, a power management unit 112, and a data management unit 114. The audio/video component 110 performs any of a wide variety of functions depending on the implementation. For example, in an ultra-thin television, the powering device 102 could represent a base unit, and the audio/video component 110 could include elements for receiving audio/video content over HDMI, DVI, $YP_RP_B$, VGA, or other connections. In a BLURAY or other DVD player or other device, the audio/video component 110 could include elements for retrieving audio/video content from optical discs. In networked devices such as APPLE TV, GOOGLE TV, ROKU, SNOWFLAKE, and BOXEE units, the audio/video component 110 could include elements for retrieving audio/video content from other networked devices. The power management unit 112 prepares power for transport over the cable 108. The data management unit 114 facilitates the transmission or reception of data, such as audio/video content and control data, over the cable 108.

The powered device 104 includes at least one audio/video component 116, a power management unit 118, and a data management unit 120. Again, the audio/video component 116 performs any of a wide variety of functions depending on the implementation. For example, in an ultra-thin television, the powered device 104 could represent a display unit, and the audio/video component 116 could include elements for receiving and displaying audio/video content. The power management unit 118 receives power transported over the cable 108. The data management unit 120 facilitates the transmission or reception of data, such as audio/video content and control data, over the cable 108.

Each power management unit 112, 118 includes any suitable structure for preparing power for transport over a cable or receiving power transported over a cable. Each data management unit 114, 120 includes any suitable structure for preparing data for transport over a cable or receiving data transported over a cable.

The cable 108 in this example can transport any suitable amount of power from the powering device 102 to the powered device 104. For example, the cable 108 could transport at least about 100 W of power up to about 1,500 W of power or even more, although in a system of multiple powered devices not every device may require at least about 100 W of power. Also, the cable 108 could have any suitable size, shape, and dimensions. For instance, the cable 108 could be very thin, such as a thickness of about one or several millimeters. Because of this, the powered device 104 could be connected to the powering device 102 using a single small cable 108, which can help to simplify the installation of ultra-thin televisions or other devices. Other features can be supported with the cable 108, such as quick connect/disconnect functionality that allows clean and safe connection and disconnection abilities (solving problems such as DC arcing, power sequencing issues, and falsely driving unconnected cables). In particular embodiments used in audio/video systems, the cable 108 may be implemented as an HDMI interconnect adapted to also transport power in accordance with aspects of this invention, which in this disclosure is referred to as an HDMI-P cable.

Additional details regarding various embodiments of these types of power supply architectures are provided below. While often described as being used with two-part ultra-thin televisions, these types of power supply architectures could be used with a wide variety of other devices or systems. For instance, these types of power supply architectures can be used with any device or system that receives power and data from external source(s). Other example applications can include lossless speaker wires, video cables for smartphones and tablet computers, computer monitor cables, and automotive displays and peripherals. Note that certain features are described below for specific implementations, such as particular lengths, data rates, or power levels. These features are for illustration only. Other embodiments of the power supply architectures could depart from these example embodiments.

Although FIG. 1 illustrates one example of an audio/video system 100, various changes may be made to FIG. 1. For example, the powering device 102 could provide power to multiple powered devices 104. Also, the functional division shown in FIG. 1 is for illustration only. Various elements in FIG. 1 could be combined, further subdivided, or omitted or additional components could be added according to particular needs.

Figure 2A:
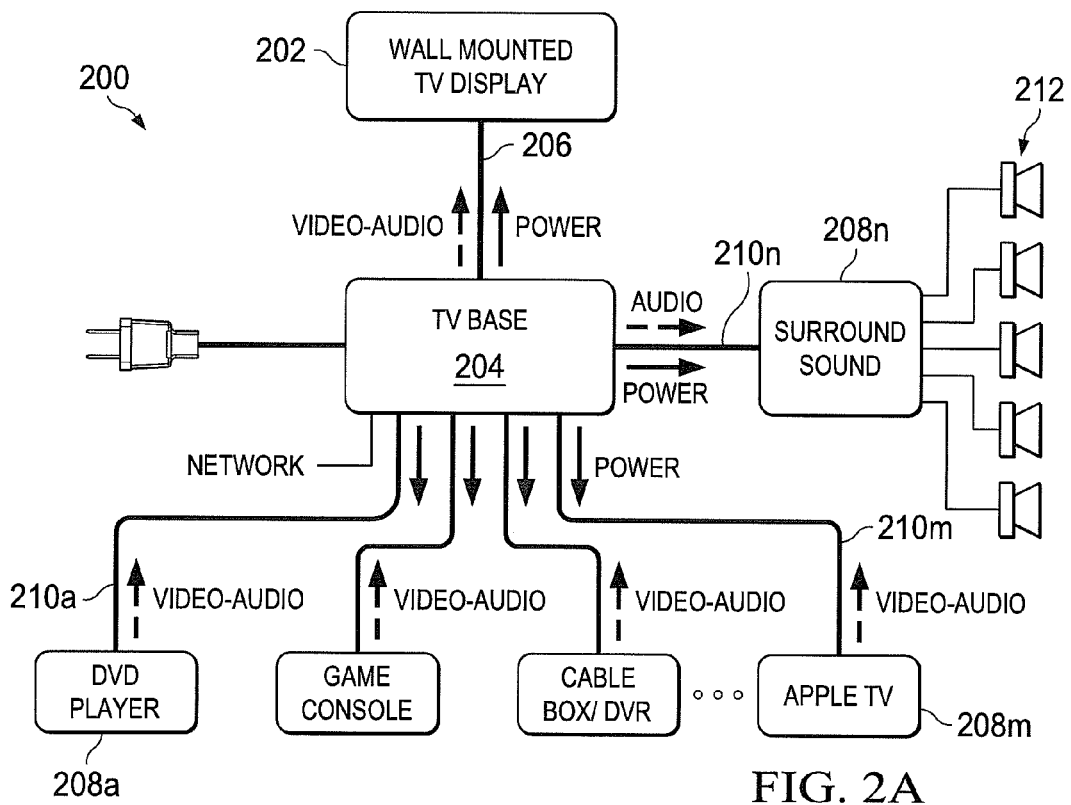

FIGS. 2A through 2C illustrate more specific example audio/video systems according to this disclosure. As shown in FIG. 2A, a system 200 includes a two-part television having a display unit 202 and a base unit 204. The units 202-204 are coupled by a cable 206, which transports both data and power between the display unit 202 and the base unit 204.

The base unit 204 is also coupled to one or more audio/video devices 208a-208n. Here, the devices 208a-208n include a DVD player (such as a BLURRY player), a game console (such as a MICROSOFT XBOX, SONY PLAYSTATION, or NINTENDO WII gaming system), a cable box or a digital video recorder (such as a TIVO DVR unit), an APPLE TV device, and a surround sound audio system. Other or additional audio/video devices could be used in the system 200. The base unit 204 is coupled to the audio/video device(s) 208a-208n via cable(s) 210a-210n. The cables 210a-210n can again transport power and data between the base unit 204 and the audio/video devices 208a-208n. In particular embodiments, the cables 206, 210a-210n represent HDMI-P cables. The surround sound system 210n here provides audio signals to multiple speakers 212.

As can be seen in FIG. 2A, only one component in the system 200 (the base unit 204) is coupled to receive AC power. All other components in the system 200 could be configured to receive operating power and data over the cables 206, 210a-210n. This can help to simplify installation of the system 200.

As shown in FIG. 2B, a system 220 includes an integrated television 222, meaning the television 222 is not divided into separate display and base units. The television 222 is coupled to one or more audio/video devices 228a-228n via cables 230a-230n. In particular embodiments, the cables 230a-230n represent HDMI-P cables.

In this example, all cables 230a-230n except cable 230c transport power from the television 222 to the associated audio/video devices while transporting data to or from the television 222. However, the audio/video device 228c is not configured to receive operating power over an HDMI-P or other cable. Instead, the audio/video device 228c is coupled to receive AC power directly, and the audio/video device 228c is coupled to an adapter 234 by a different type of cable 236. For instance, the adapter 234 may allow a standard HDMI cable 236 to interface with an HDMI-P port of the television 222. The adapter 234 includes any suitable structure facilitating use of one type of cable with another type of cable interface.

As shown in FIG. 2C, a system 240 includes a television 242, which is coupled to one or more audio/video devices 248a-248n via cables 250a-250n. In this example, the television 242 is not configured to provide power to the audio/video devices 248a-248n, and the cables 250a-250n could represent standard cables (such as HDMI cables). Here, the audio/video devices 248b-248n are configured to receive operating power directly from AC connections and not from the television 242. As a result, the cables 250b-250n transport data but not power to or from the television 242.

The audio/video device 242a is configured to receive operating power over a cable, but the television 242 cannot provide power over the cable 250a. Instead, an adapter 254 is coupled between the audio/video device 248a and the television 242. The adapter 254 can provide power over a cable 256 (such as an HDMI-P cable) to the audio/video device 248a, and the adapter 254 allows data exchange between the cables 250a, 256. This allows the audio/video device 248a to provide content to the television 242 while receiving power over the cable 256.

Although FIGS. 2A through 2C illustrate more specific examples of audio/video systems, various changes may be made to FIGS. 2A through 2C. For example, FIGS. 2A through 2C illustrate examples of how data and power can be transported over a single cable. This functionality could be used by any other suitable device or in any other suitable system.

Figure 3:
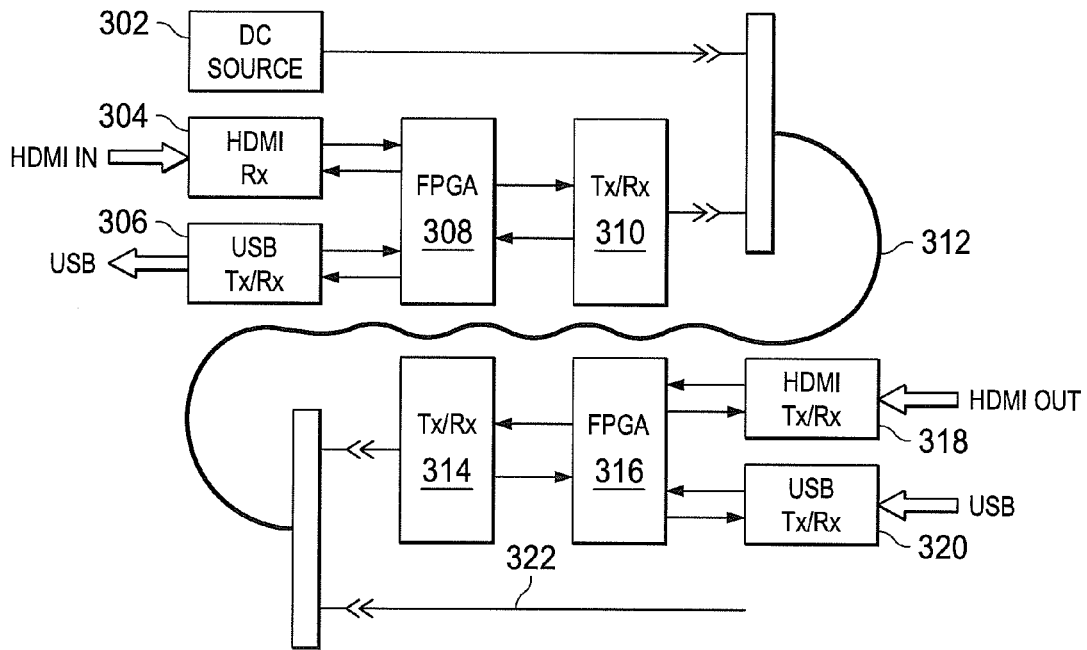
FIGS. 3 through 5 illustrate example powering and powered devices in an audio/video system according to this disclosure.
Figure 4:
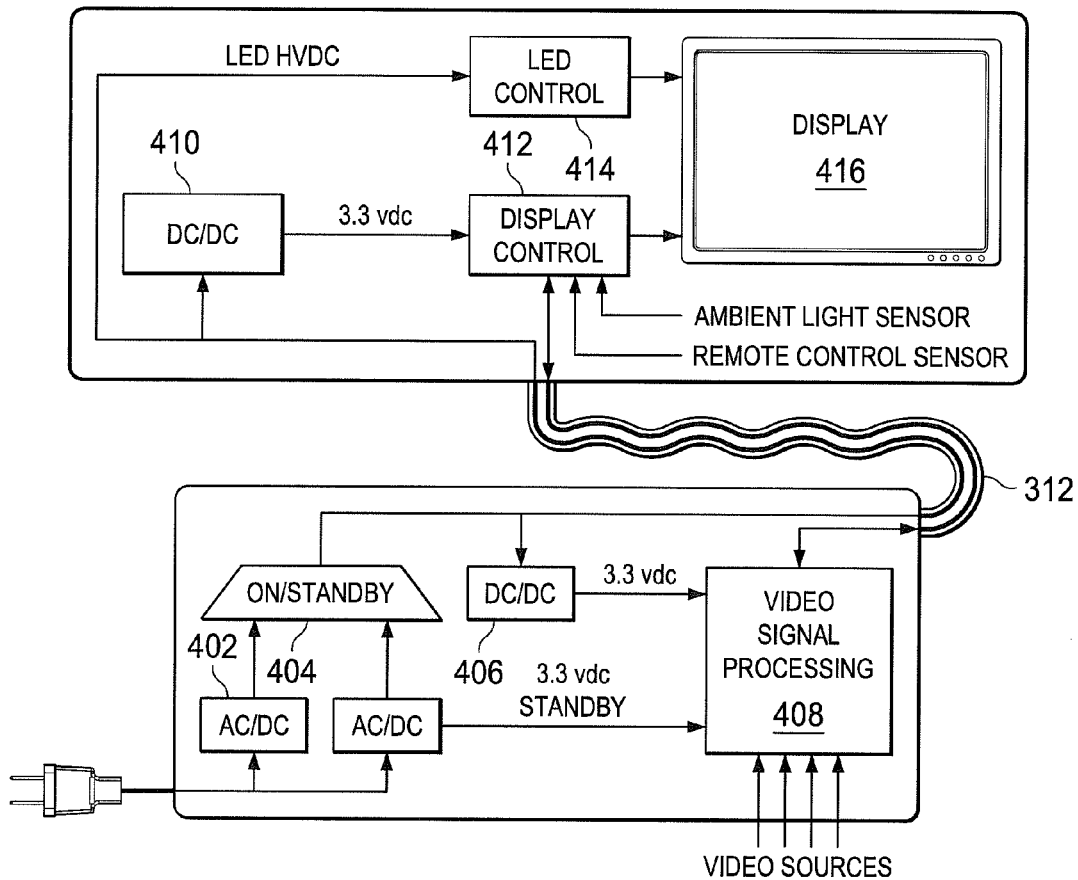
Figure 5:
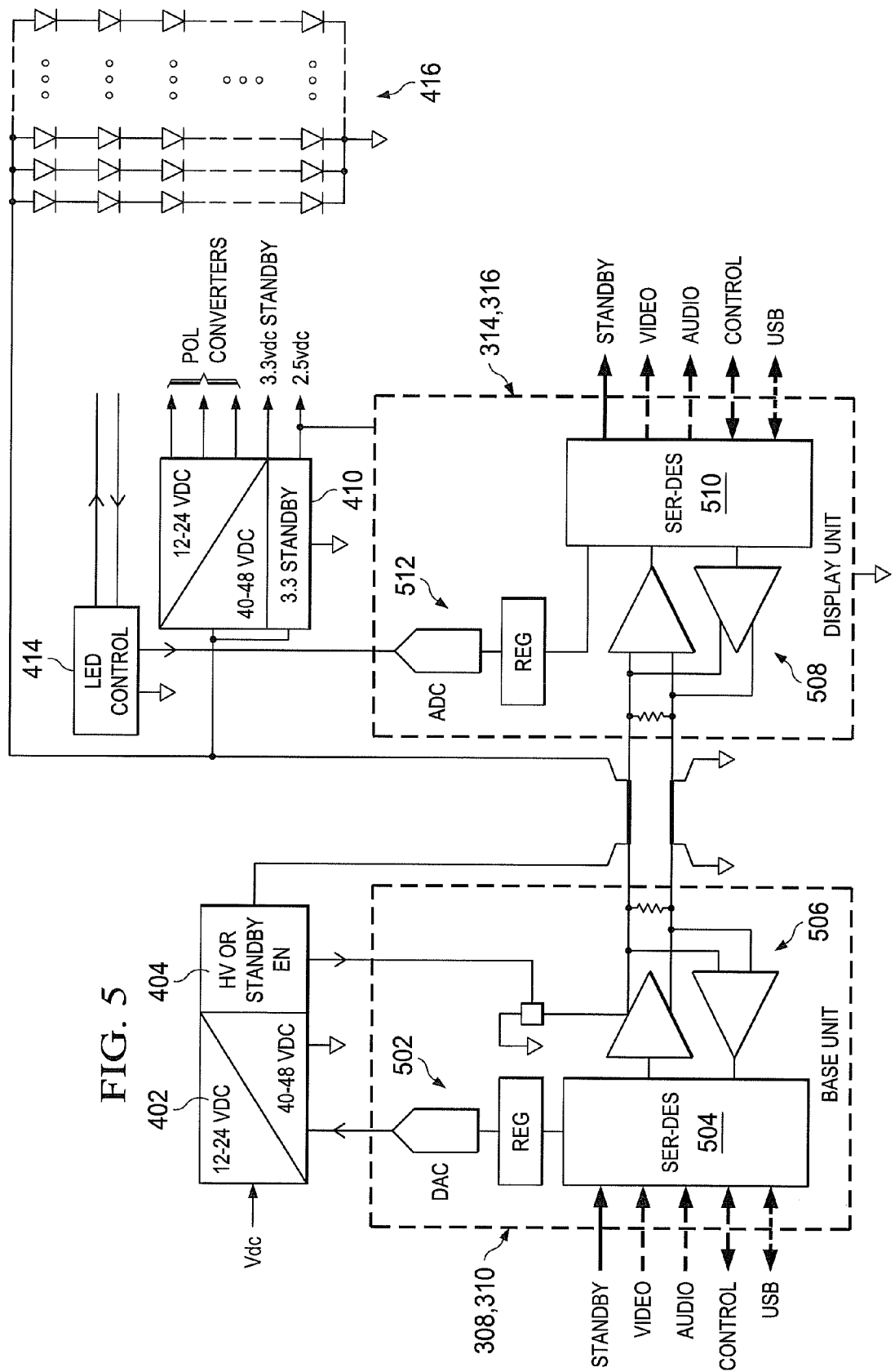

FIGS. 3 through 5 illustrate example powering and powered devices in an audio/video system according to this disclosure. The powering and powered devices shown in FIGS. 3 through 5 could, for example, represent the powering and powered devices 102-104 of FIG. 1. However, other implementations of the powering and powered devices could also be used.

As shown in FIG. 3, a powering device includes a direct current (DC) source 302, which provides DC output power. The DC source 302 includes any suitable source of DC energy, such as an AC/DC converter or a DC/DC converter. The powering device also includes an HDMI receiver 304 and a Universal Serial Bus (USB) transceiver 306. The HDMI receiver 304 includes any suitable structure for receiving audio/video data. The audio/video data could be received from any suitable source(s), such as a cable box, DVR, DVD player, or other audio/video device(s). The USB transceiver 306 includes any suitable structure facilitating transmission and reception of data over a USB bus.

The powering device further includes a field programmable gate array (FPGA) 308 and a cable transceiver 310. The FPGA 308 performs various functions to support the transport of data to or from a powered device. For example, the FPGA 308 could serialize audio/video data, USB data, and control data for transmission over a cable 312. The FPGA 308 could also deserialize USB and control data received over the cable 312. The FPGA 308 may perform any other or additional functions as needed or desired.

The transceiver 310 supports the communication of data over the cable 312. For example, if the cable 312 includes one or more optical fibers, the transceiver 310 could include an electrical-to-optical converter. If the cable 312 includes multiple electrical conductors, the transceiver 310 could include a low-voltage differential signaling (LVDS) transceiver or other differential signaling transceiver. The transceiver 310 could include any other suitable structure for transmitting or receiving information over a cable.

The cable 312 transports both power and data (including audio/video, USB, and control data) between the powering and powered devices. Example implementations of the cable 312 are described below.

The powered device in this example includes a cable transceiver 314 and an FPGA 316. The transceiver 314 includes any suitable structure for transmitting or receiving information over a cable. The FPGA 316 performs various functions to support the transport of data to or from a powering device. For example, the FPGA 316 could deserialize audio/video data, USB data, and control data received over the cable 312. The FPGA 316 could also serialize USB and control data for transmission over the cable 312. The FPGA 316 may perform any other or additional functions as needed or desired.

The powered device also includes an HDMI transceiver 318 and a USB transceiver 320. The HDMI transceiver 318 can receive audio/video data and output the data, such as to a display device for presentation. The USB transceiver 320 supports communication with at least one external USB device, such as a USB webcam or other device. The HDMI transceiver 318 includes any suitable structure for transmitting and receiving audio/video data. The USB transceiver 320 includes any suitable structure facilitating transmission and reception of data over a USB bus.

A power bus 322 provides power from the cable 312 to other components of the powered device. For example, the power bus 322 could provide DC power to a display device, such as a television or computer display.

FIGS. 4 and 5 illustrate additional details of example powering and powered devices, which here represent a base unit and a display unit of an ultra-thin television. Some of the details from FIG. 3 are omitted from FIGS. 4 and 5 for ease of illustration and explanation.

As shown in FIG. 4, the DC source 302 in the base unit includes multiple AC/DC converters 402, which convert an AC input voltage into different DC output voltages. The different DC output voltages could be associated with normal operation and standby operation of the television. A multiplexer 404 selects the appropriate DC output voltage based on the current operating mode of the television. The operating mode of the television set could be determined by logic included in the DC/DC converter 402. One of the AC/DC converters 402 or a DC/DC converter 406 generates a suitable voltage for a video signal processing unit 408, which receives audio/video data from one or more sources and provides the data to the display unit via the cable 312. The video signal processing unit 408 could be implemented within the FPGA 308.

The display unit of the television includes a DC/DC converter 410, which generates a suitable voltage using power received over the cable 312 and over the bus 322. A display controller 412 receives the DC voltage from the converter 410, and a light emitting diode (LED) controller 414 operates using power received over the cable 312 and over the bus 322. The LED controller 414 controls the operation of LEDs in a display 416, and the display controller 412 controls the display of content on the display 416. The display controller 412 operates using inputs such as data from an ambient light sensor or a remote control sensor.

As shown in FIG. 5, the AC/DC converters 402 generate different DC voltages, and the multiplexer 404 selects one of the DC voltages for output over the cable 312. The FPGA 308 includes voltage control circuitry 502 for controlling the converters 402 and a mechanism for communicating with the DC/DC converter 402. For example, a register can store a value representing a desired output voltage, and a digital-to-analog converter (DAC) can convert the stored value into an analog control signal for controlling the converters 402. The FPGA 308 also includes a serializer-deserializer (SER-DES) 504, which can serialize multiple data streams (such as audio, video, control, and USB data) for transmission over a limited number of conductive lines and deserialize data received over the conductive lines. The transceiver 310 includes driving circuitry 510 that drives signals over the cable 312 and receives signals from the cable 312.

The transceiver 314 in the display unit includes driving circuitry 508, which drives signals over the cable 312 and receives signals from the cable 312. The FPGA 316 in the display unit includes a SER-DES 510, which can serialize multiple data streams (such as audio, video, control, and USB data) for transmission over a limited number of conductive lines and deserialize data received over the conductive lines. The FPGA 316 in the display unit also includes voltage control circuitry 512, which is used to control the converters 402 by providing feedback to the powering device. For example, an analog-to-digital converter (ADC) can convert an analog feedback signal into a digital value that is stored in a register, and the stored value can be sent to the base unit over the cable 312 as control data.

Figure 6:
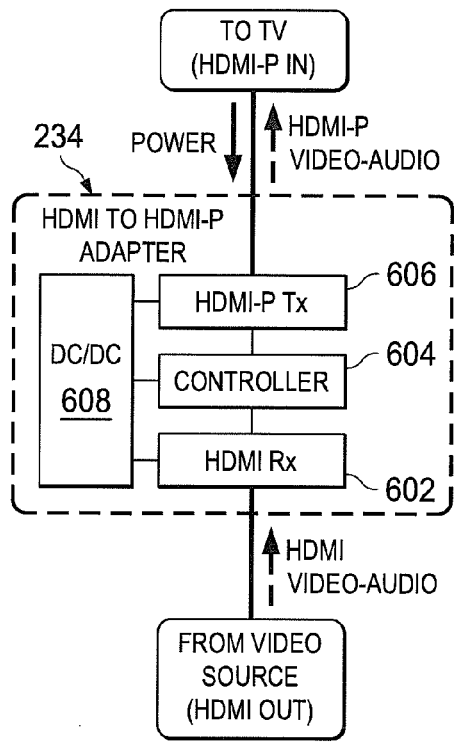
FIGS. 6 and 7 illustrate example adapters for powering and powered devices in an audio/video system according to this disclosure.
Figure 7:
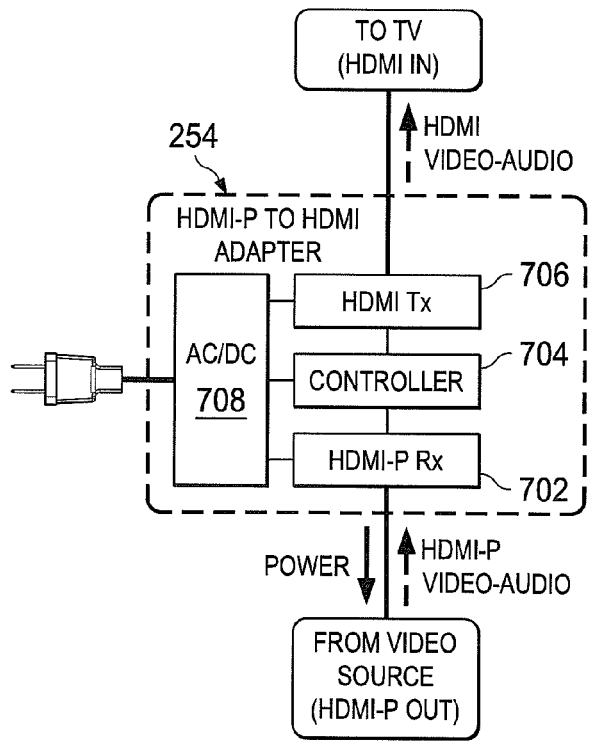

FIGS. 6 and 7 illustrate example adapters for powering and powered devices in an audio/video system according to this disclosure. As shown in FIG. 6, the adapter 234 supports interaction between a television or other device attempting to provide power over an HDMI-P cable and an audio/video source that cannot operate using power received over the HDMI-P cable.

The adapter 234 here includes an HDMI receiver 602, a controller 604, an HDMI-P transmitter 606, and a DC/DC converter 608. The HDMI receiver 602 receives audio/video data from the audio/video source using a standard HDMI connection. The controller 604 supports the exchange of data between the HDMI receiver 602 and the HDMI-P transmitter 606, end-to-end authentication, and other functions. The HDMI-P transmitter 606 provides the audio/video data to the television or other device over an HDMI-P cable. The DC/DC converter 608 receives power over the HDMI-P cable and provides power to the other components of the adapter 234. In this way, the adapter 234 requires no direct AC connection and can instead operate using power received over the HDMI-P cable.

As shown in FIG. 7, the adapter 254 supports interaction between an audio/video source attempting to operate using power received over an HDMI-P cable and a television or other device that cannot provide power over the HDMI-P cable. The adapter 254 includes an HDMI-P receiver 702, a controller 704, an HDMI transmitter 706, and an AC/DC converter 708. The HDMI-P receiver 702 receives audio/video data from the audio/video source using an HDMI-P cable. The controller 704 supports the exchange of data between the HDMI-P receiver 702 and the HDMI transmitter 706, end-to-end authentication, and other functions. The HDMI transmitter 706 provides the audio/video data to the television or other device over an HDMI cable. The AC/DC converter 708 receives power from an AC connection and provides power to the other components of the adapter 254 and to the audio/video source over the HDMI-P cable. In this way, the adapter 254 provides power to the audio/video source, and the television or other device is unaware that the audio/video source is being powered over the HDMI-P cable.

Although FIGS. 3 through 5 illustrate examples of powering and powered devices in an audio/video system, various changes may be made to FIGS. 3 through 5. Also, although FIGS. 6 and 7 illustrate examples of adapters for powering and powered devices in an audio/video system, various changes may be made to FIGS. 6 and 7. For example, in these figures, the use of specific types of connections (such as HDMI and USE connections) and the use of specific values (such as voltage levels) are for illustration only. Also, each element in these figures can be implemented using any suitable structure for performing the described function(s).

Note that the cables used in these figures can transport various amounts of power and support various data rates depending on the implementation. For example, the cables could transport at least around 100 W of power up to about 1,500 W of power or even more. Specific values could include about 100 W, 150 W, 200 W, 300 W, 500 W, 750 W, 1000 W, 1250 W, and 1500 W. With a suitably low power level, the cables could represent "safe-to-touch" cables, such as when the cables transport up to 150 W of power at $60V_{DC}$. The cables could also transport any suitable type and amount of data. Examples include data rates supporting high-definition or 3D high-definition video at refresh rates like 60 Hz, 120 Hz, or 240 Hz and color values like 24-bit or 30-bit values. Specific data rates could include about 7 Gbps, 10 Gbps, 15 Gbps, 16.5 Gbps, 20 Gbps, 28 Gbps, or 50 Gbps in the forward direction (away from the video source) and about 10 kbps, 1 Mbps, 10 Mbps, 50 Mbps, 100 Mbps, 1 Gbps, 3 Gbps, or 5 Gbps in the reverse direction (towards the video source). The reverse direction can be used to support functions such as content protection for digital rights management (DRM). The reverse direction can also support functions such as web-based audio/video conferencing, game controllers, and review of Flash memory or memory stick storage devices. Data can be packetized, buffered, and transmitted in half-duplex or full-duplex mode over a cable. In addition, the cables could have any suitable lengths, such as about 2 m, 3 m, 7 m, or 10 m.

When used with ultra-thin televisions having separate base and display units, the use of cables that transport both power and data can provide various benefits. For instance, the display unit can be mounted on any wall with minimal visual intrusion, and designers can fashion any number of low visibility solutions for coupling the display unit to a base unit. "Safe-to-touch" power can enable reduced or minimal thickness, cost, and weight of a cable. The display unit can have a reduced or minimal housing as AC/DC converters are not required in the display unit, and the base unit can have reduced or minimal AC/DC power loss. In addition, the system can support variable supply voltage optimization, where the built-in control feedback allows for adjustment of the supply voltage to help minimize LED power usage. This can enable superior LED backlighting while using a driving architecture with closed-loop power control between the base unit and the display unit.

Figure 8A:
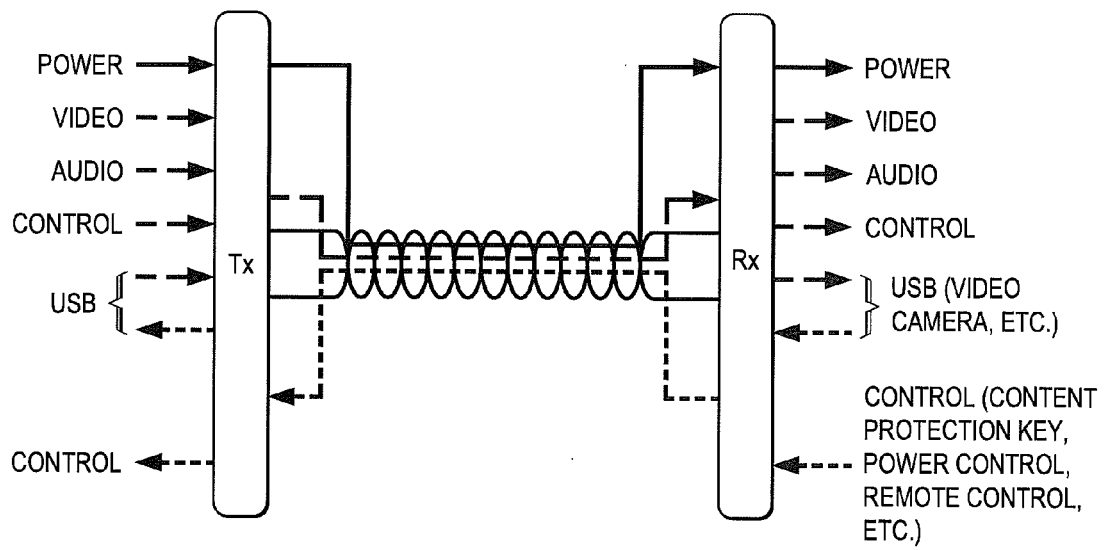
Figure 8B:
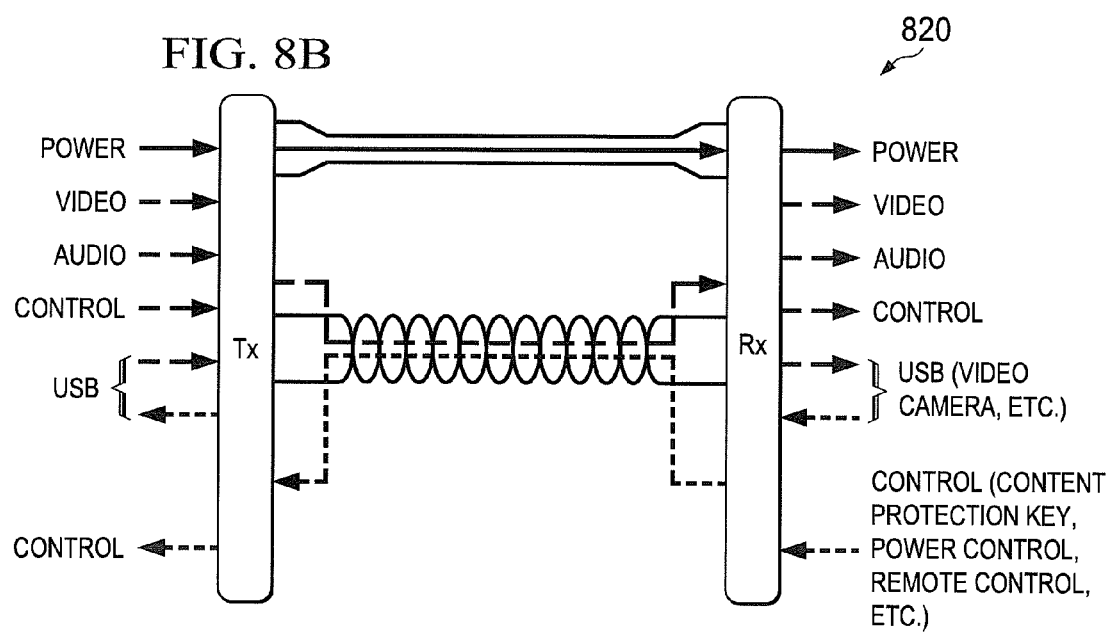

FIGS. 8A through 20 illustrate example powering and powered devices along with cables supporting transport of power and audio/video data according to this disclosure. FIGS. 8A and 8B illustrate two different approaches for transporting power and data over a common cable. As shown in FIG. 8A, a cable 800 transports power and data over common conductors of the cable 800. Here, the data includes audio, video, bi-directional control, and bi-directional USB data. In particular embodiments, the cable 800 includes two wires (four conductors) total.

As shown in FIG. 8B, a cable 820 transports power and data over different conductors of the cable 820. Here, the data again includes audio, video, bi-directional control, and bi-directional USB data. The data is transported over a first set of conductors, and power is transported over a second set of conductors. In particular embodiments, the cable 820 includes four wires (four conductors) total.

FIGS. 9 through 20 illustrate more specific example implementations of powering and powered devices, as well as cables supporting transport of power along with audio/video data. The components used with the cables shown here could form, for example, portions of transceivers on either end of the cable.

Figure 9:
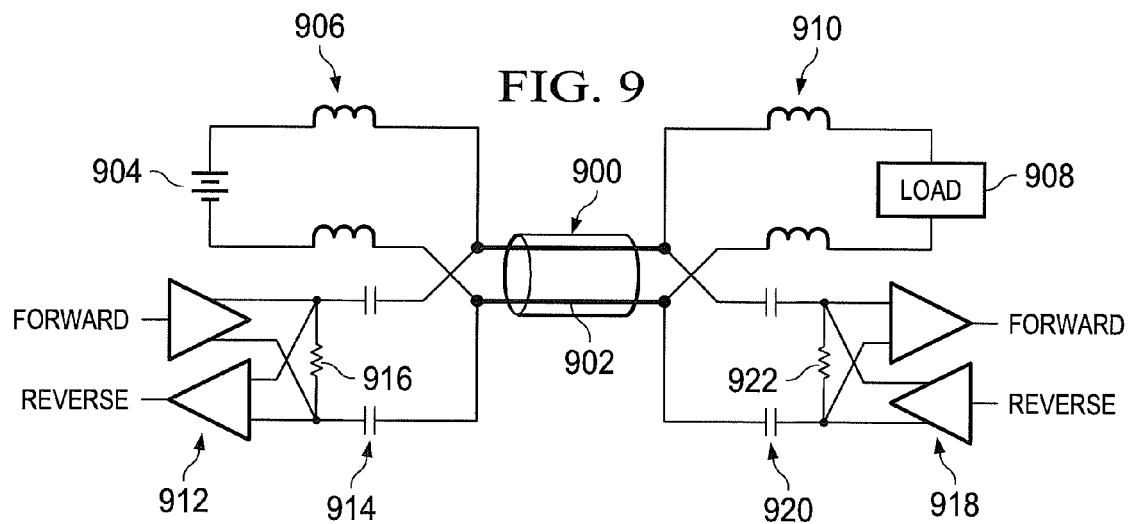

As shown in FIG. 9, a cable 900 includes two conductors 902. At one end, the conductors 902 are coupled to a voltage source 904 (such as a DC/DC converter) via inductors 906. At the other end, the conductors 902 are coupled to a load 908 (such as a television or other audio/video device) via inductors 910. The inductors 906, 910 support the transport of power over the conductors 902.

To support the transport of data over the conductors 902, at one end the cable 900 is coupled to driving circuitry 912 via capacitors 914. Inputs/outputs of the driving circuitry 912 are coupled together by a resistor 916. At the other end, the cable 900 is coupled to driving circuitry 918 via capacitors 920. Inputs/outputs of the driving circuitry 918 are coupled together by a resistor 922.

Each inductor 906, 910 includes any suitable inductive structure having any desired inductance. Each capacitor 914, 920 includes any suitable capacitive structure having any desired capacitance. Each resistor 916, 922 includes any suitable resistive structure having any desired resistance.

As shown in FIG. 10, a cable 1000 includes two conductors 1002. At one end, one conductor 1002 is coupled to a voltage source 1004 via an inductor 1006. At the other end, that conductor 1002 is coupled to a load 1008 via an inductor 1010.

Driving circuitry 1012 is coupled to a first end of both conductors 1002 via capacitors 1014, and inputs/outputs of the driving circuitry 1012 are coupled to a resistor 1016. Also, a transformer 1024 is coupled between (i) the driving circuitry 1012 and the resistor 1016 and (ii) the capacitors 1014. One winding of the transformer 1024 is also coupled to the voltage source 1004, effectively functioning as an inductor coupled to the voltage source 1004. The first end of one conductor 1002 is also coupled to an inductor 1026 and a capacitor 1028 coupled in series.

Driving circuitry 1018 is coupled to a second end of the conductors 1002 via capacitors 1020, and inputs/outputs of the driving circuitry 1018 are coupled to a resistor 1022. Also, a transformer 1030 is coupled between (i) the driving circuitry 1018 and the resistor 1022 and (ii) the capacitors 1020. One winding of the transformer 1030 is also coupled to the load 1008, effectively functioning as an inductor coupled to the load 1008. The second end of one conductor 1002 is also coupled to an inductor 1032 and a capacitor 1034 coupled in series.

As shown in FIG. 11, a cable 1100 includes three conductors 1102. A first conductor 1102 is coupled to a voltage source 1104 and to a load 1108 at opposing ends of the first conductor 1102. Driving circuitry 1112 is coupled to a first end of two other conductors 1102 via a transformer 1124, and inputs/outputs of the driving circuitry 1112 are coupled by a resistor 1116. Driving circuitry 1118 is coupled to a second end of the two other conductors 1102 via a transformer 1130, and inputs/outputs of the driving circuitry 1118 are coupled by a resistor 1122.

Figure 12:
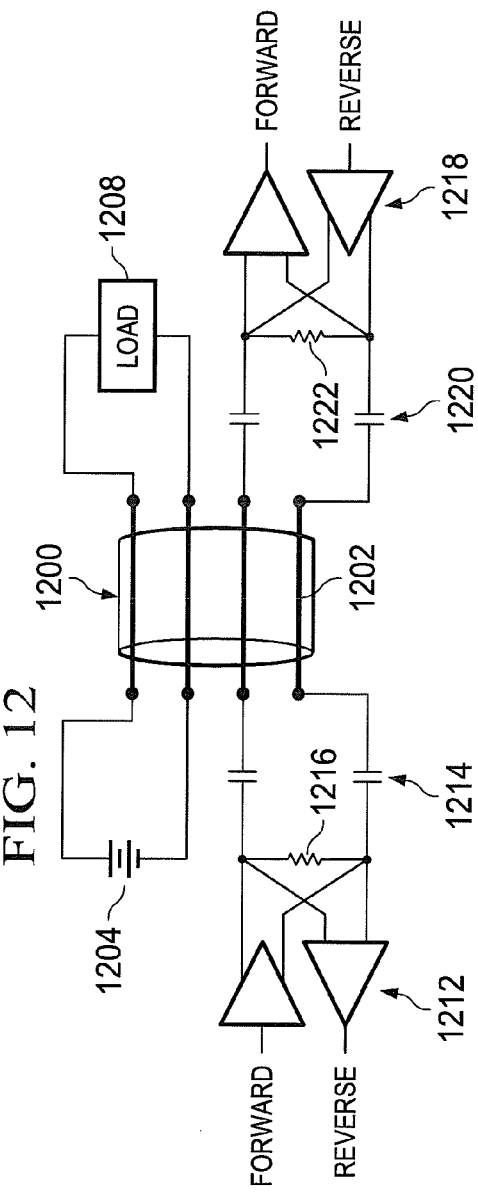

As shown in FIG. 12, a cable 1200 includes four conductors 1202. Two of the conductors 1202 are coupled to a voltage source 1204 and to a load 1208 at opposing ends. Driving circuitry 1212 is coupled to a first end of two other conductors 1202 via capacitors 1214, and inputs/outputs of the driving circuitry 1212 are coupled by a resistor 1216. Driving circuitry 1218 is coupled to a second end of the two other conductors 1202 via capacitors 1220, and inputs/outputs of the driving circuitry 1218 are coupled by a resistor 1222.

Figure 13:
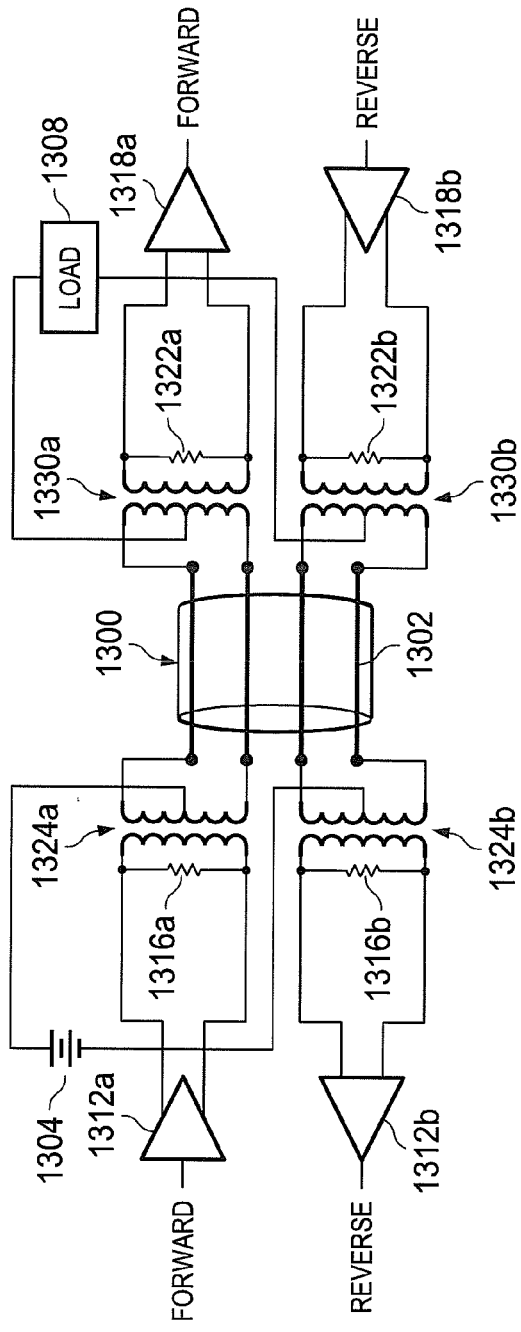

In FIGS. 9 through 12, the driving circuits are shown as having both transmit and receive paths over the same conductors of a cable. However, this is not required. As shown in FIG. 13, a cable 1300 includes four conductors 1302. At one end, forward driving circuitry 1312a is coupled to a transformer 1324a, and outputs of the driving circuitry 1312a are coupled to a resistor 1316a. Also, reverse driving circuitry 1312b is coupled to a transformer 1324b, and inputs of the driving circuitry 1312b are coupled to a resistor 1316b. The transformers 1324a-1324b are coupled to the conductors 1302 and to a voltage source 1304.

At the other end, forward driving circuitry 1318a is coupled to a transformer 1330a, and inputs of the driving circuitry 1318a are coupled to a resistor 1322a. Also, reverse driving circuitry 1318b is coupled to a transformer 1330b, and outputs of the driving circuitry 1318b are coupled to a resistor 1322b. The transformers 1330a-1330b are coupled to the conductors 1302 and to a load 1308.

Figure 14:
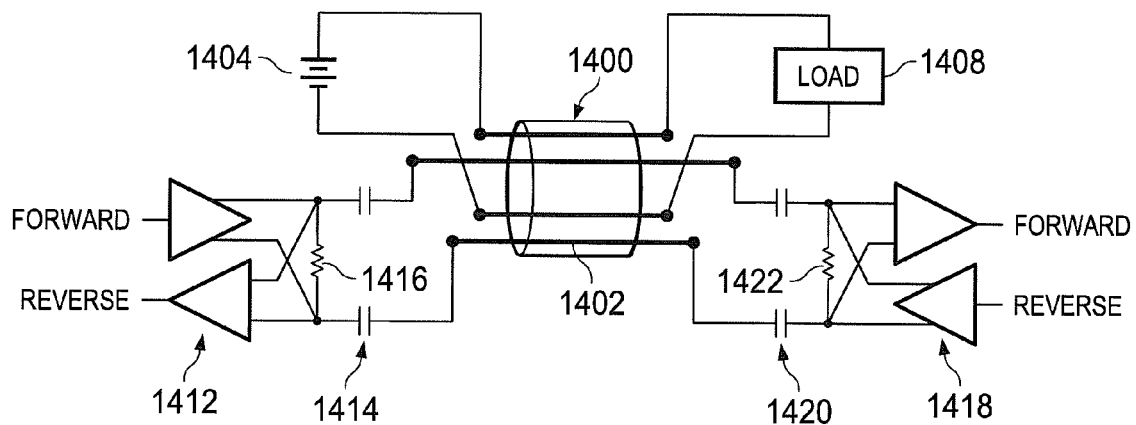

As shown in FIG. 14, a cable 1400 includes four conductors 1402, which are grouped into groups of two that are self-shielded. One conductor 1402 in each group is coupled to a voltage source 1404 and to a load 1408 at opposing ends. Driving circuitry 1412 is coupled to a first end of two other conductors 1402 via capacitors 1414, and inputs/outputs of the driving circuitry 1412 are coupled by a resistor 1416. Driving circuitry 1418 is coupled to a second end of the two other conductors 1402 via capacitors 1420, and inputs/outputs of the driving circuitry 1418 are coupled by a resistor 1422.

Figure 15:
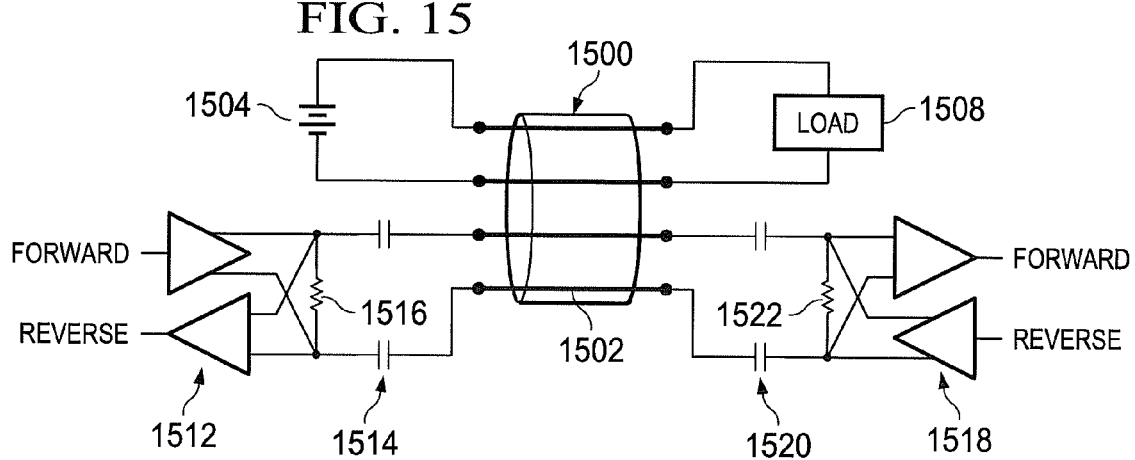

As shown in FIG. 15, a cable 1500 includes four conductors 1502, two of which can be formed using a twisted pair. Two conductors 1502 are coupled to a voltage source 1504 and to a load 1508 at opposing ends. Driving circuitry 1512 is coupled to a first end of two other conductors 1502 via capacitors 1514, and inputs/outputs of the driving circuitry 1512 are coupled by a resistor 1516. Driving circuitry 1518 is coupled to a second end of the two other conductors 1502 via capacitors 1520, and inputs/outputs of the driving circuitry 1518 are coupled by a resistor 1522.

Figure 16A:
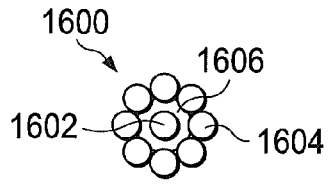

FIGS. 16A through 20 illustrate example conductors within a cable supporting transport of power along with audio/video data according to this disclosure. FIGS. 16A through 16C illustrate example conductors in the four-conductor cable 1400 of FIG. 14. As shown in FIG. 16A, a conductive pair 1600 includes a first conductor 1602 and a second conductor 1604 (also called a sheath) separated by an insulator 1606. The conductor 1602 represents an axial conductor, while the conductor 1604 represents a multi-strand conductor around the axial conductor 1602, thereby forming a coaxial structure.

Figure 16B:
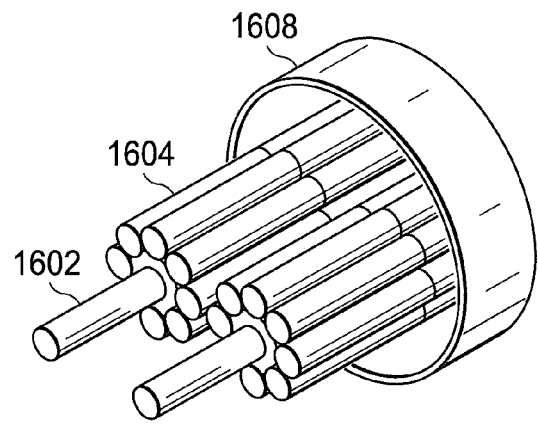
Figure 16C:
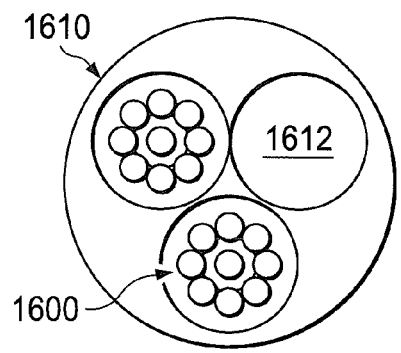

As shown in FIG. 16B, a cable 1608 includes two conductive pairs 1600. The cable 1608 shown here is generally oval, although other shapes (such as flat or rectangular) could be used. Another example is shown in FIG. 16C, where a cable 1610 includes two conductive pairs 1600 and a dummy conductor 1612. The dummy conductor 1612 could, however, be omitted.

In some embodiments, the cable 1608 could have a thickness of about 1 mm, and the cable 1610 could have a thickness of about 1.5 mm. Also, the axial conductors 1602 in two conductive pairs 1600 could be used to transport a differential data signal (relative to ground). Further, the multi-strand conductors 1604 in two conductive pairs 1600 could represent sheaths, where one is used to carry a ground voltage and another is used to carry a DC voltage relative to ground.

In particular embodiments, the multi-strand conductors 1604 in the conductive pairs 1600 could have spiral windings, and the spiral directions and pitches can be independent of each other. Also, the axial conductors 1602 and the multi-strand conductors 1604 in the conductive pairs 1600 could have any suitable wire gauge(s), and the wire gauges can be independent of each other. The multi-strand conductors 1604 can be isolated Ohmically and coupled capacitively in order to reduce degradation of the shield effect. At 48V DC sheath-to-sheath, a two-meter cable could carry about 100 W of power and data at a rate of about 15 Gbps. The conductors here could represent 23-gauge wire.

Figure 17A:
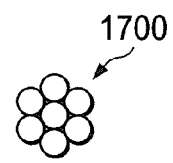
Figure 17B:
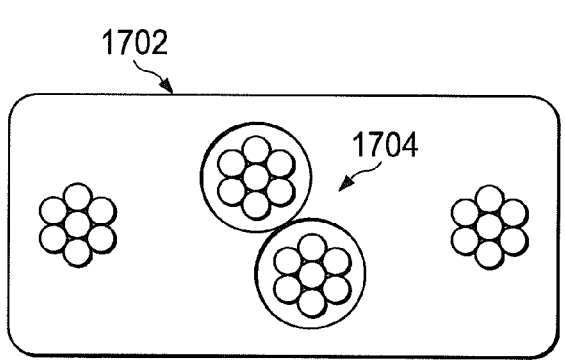
Figure 17C:
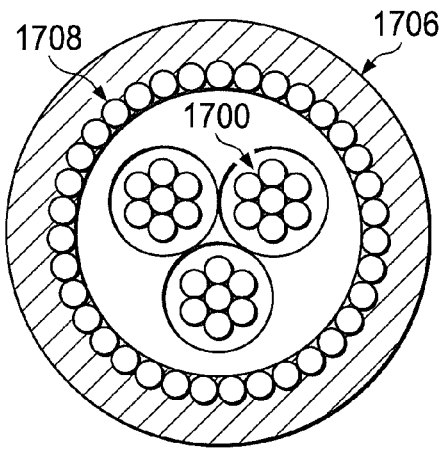

FIGS. 17A through 17C illustrate example conductors in the four-conductor cable 1500 of FIG. 15. As shown in FIG. 17A, a conductor 1700 represents a multi-strand conductor. Multiple conductors 1700 can be incorporated into a flat cable 1702 as shown in FIG. 17B. In this example, two of the conductors 1700 are independent and located on opposite sides of the cable 1702, and these conductors could be used for power transport. Two other conductors 1700 form a twisted pair 1704, and these conductors could be used for data transport. Alternatively, three conductors 1700 could be used in a circular cable 1706 as shown in FIG. 17C, and an outer conductor 1708 could be used as a fourth conductor in this example. The conductors here could represent 24-gauge wire.

Figure 18:
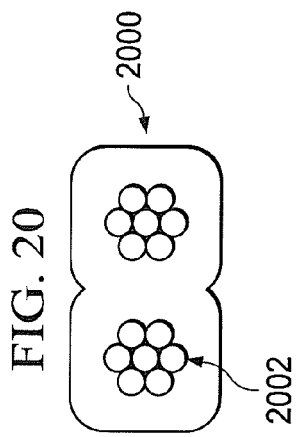

FIG. 18 illustrates example conductors in the three-conductor cable 1100 of FIG. 11. As shown in FIG. 18, a coaxial cable 1800 includes an axial conductor 1802, a first multi-strand conductor 1804 around the axial conductor 1802, and a second multi-strand conductor 1806 around the first multi-strand conductor 1804. An insulator could be used between adjacent conductors. In some embodiments, the axial conductor 1802 could transport a signal relative to ground, the first multi-strand conductor 1804 could carry a DC or ground voltage, and the second multi-strand conductor 1806 could carry a DC or AC voltage relative to ground or ground itself (to enable a safe cable).

In particular embodiments, the multi-strand conductors 1804-1806 could have spiral windings, and the spiral directions and pitches can be independent of each other. Also, the axial conductor 1802 and the multi-strand conductors 1804-1806 could have any suitable wire gauge(s), and the wire gauges can be independent of each other. The multi-strand conductors 1804-1806 can be isolated Ohmically and coupled capacitively in order to reduce degradation of the shield effect. At 200V DC sheath-to-sheath, a three-meter cable could carry about 300 W of power and data at a rate of about 20 Gbps.

Figure 19:
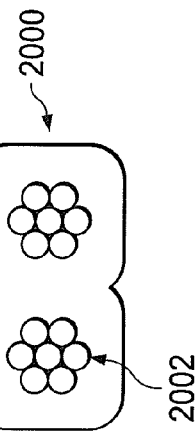

FIG. 19 illustrates example conductors in the four-conductor cables 1200-1500 of FIGS. 12 through 15. As shown in FIG. 19, a cable 1900 includes four twisted pairs 1902 of conductors, where each twisted pair includes two multi-strand conductors. The conductors here could represent 24-gauge wire. In particular embodiments, the cable 1900 could transport about 40 W of power up to about 100 m in length.

Figure 20:
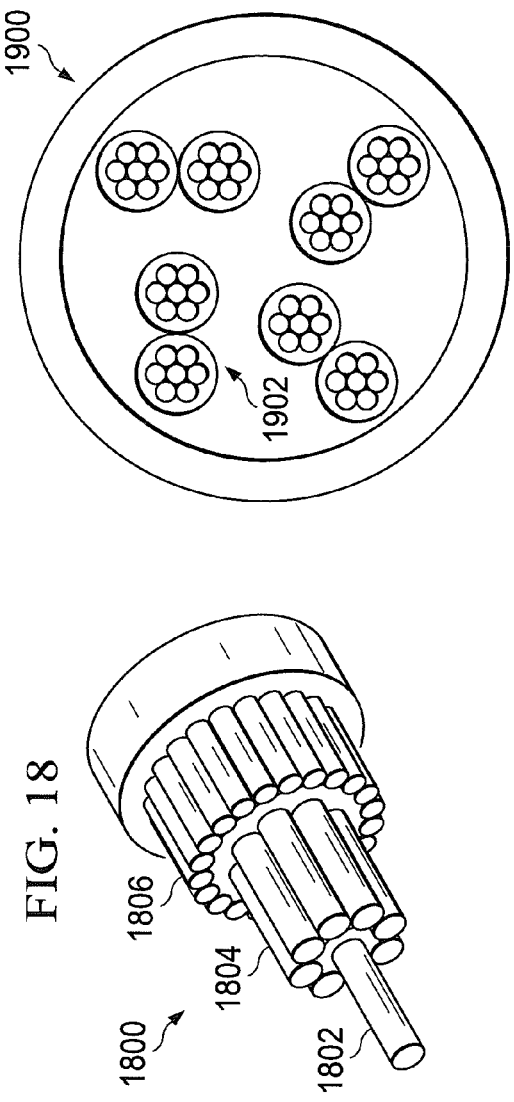

FIG. 20 illustrates example conductors in the two-conductor cable 900-1000 of FIGS. 9 and 10. As shown in FIG. 20, a cable 2000 includes two conductors 2002, each of which includes two multi-strand conductors. The conductors here could represent 14-gauge wire. In particular embodiments, the cable 2000 could transport about 1,500 W of power up to about 12 m in length.

Although FIGS. 8A through 20 illustrate examples of powering and powered devices along with cables supporting transport of power and audio/video data, various changes may be made to FIGS. 8A through 20. For example, the features shown in one or more of these figures could be used in any other of these figures. Also, any other suitable transceivers and cables could be used. For instance, electrical conductors used for data transport could be replaced by optical fibers. In this document, the phrase "signal line" refers to an electrical conductor, optical fiber, or other structure within a cable for transporting at least part of a data signal.

Figure 21:
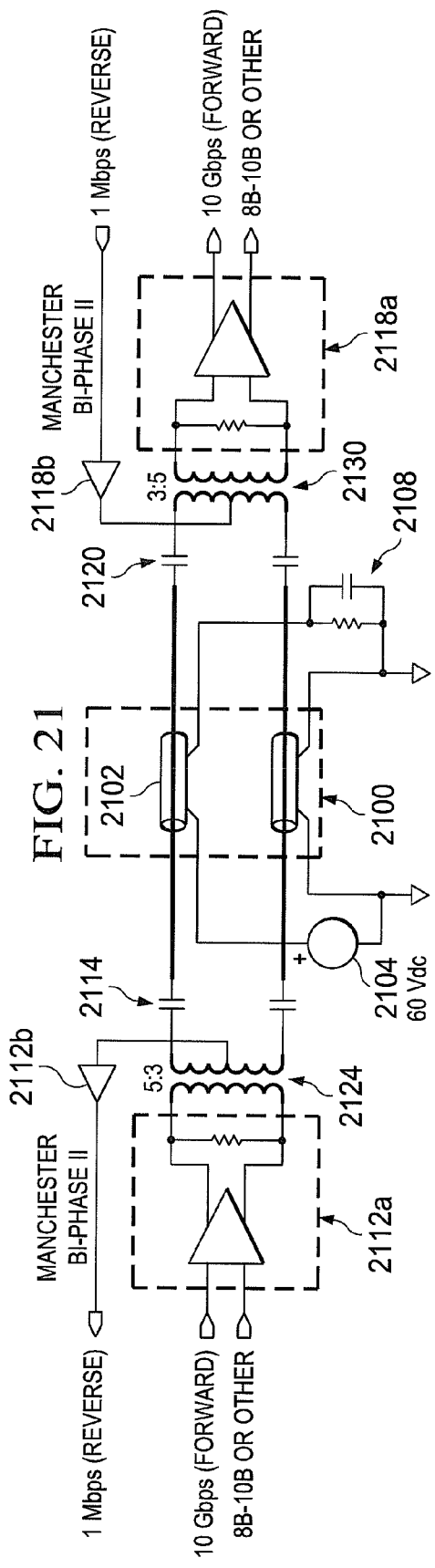
FIGS. 21 through 23 illustrate additional example powering and powered devices in an audio/video system according to this disclosure.
Figure 22:
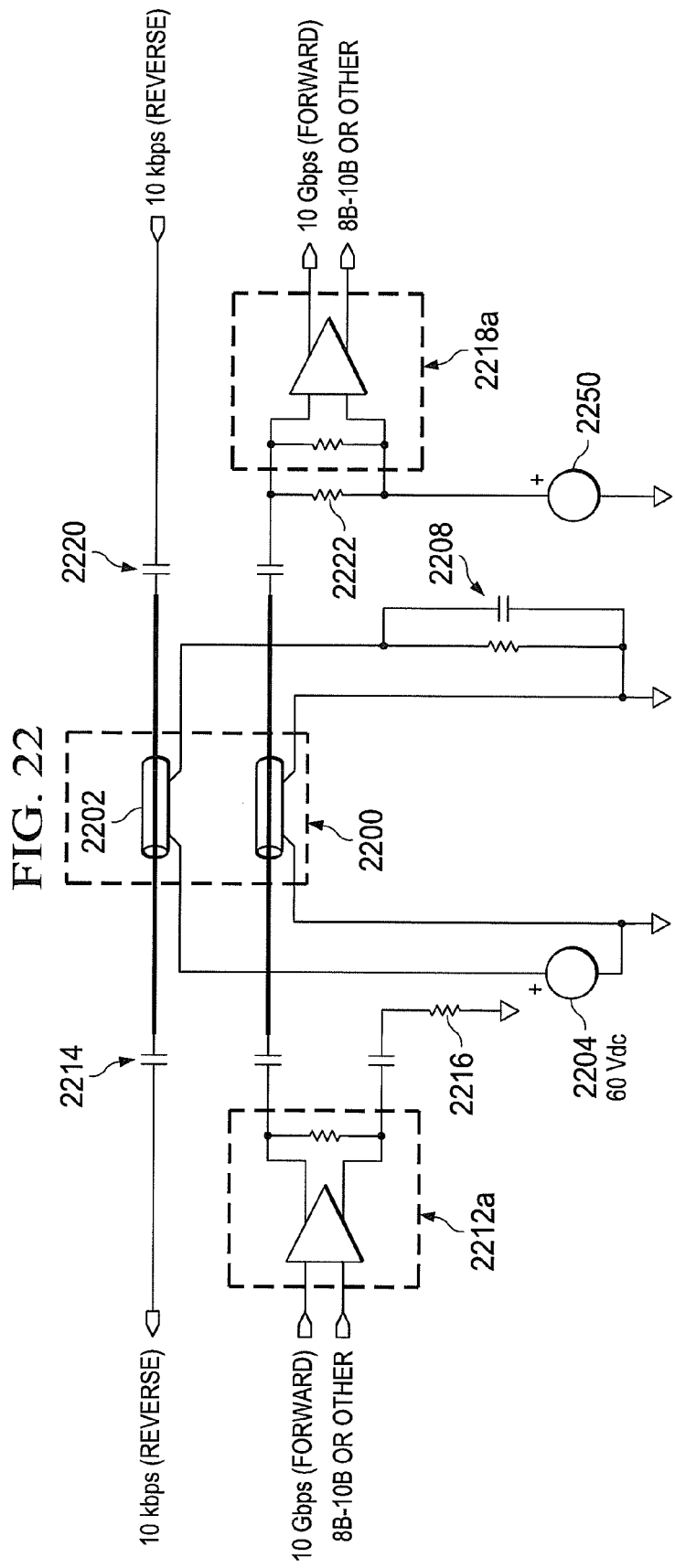
Figure 23:
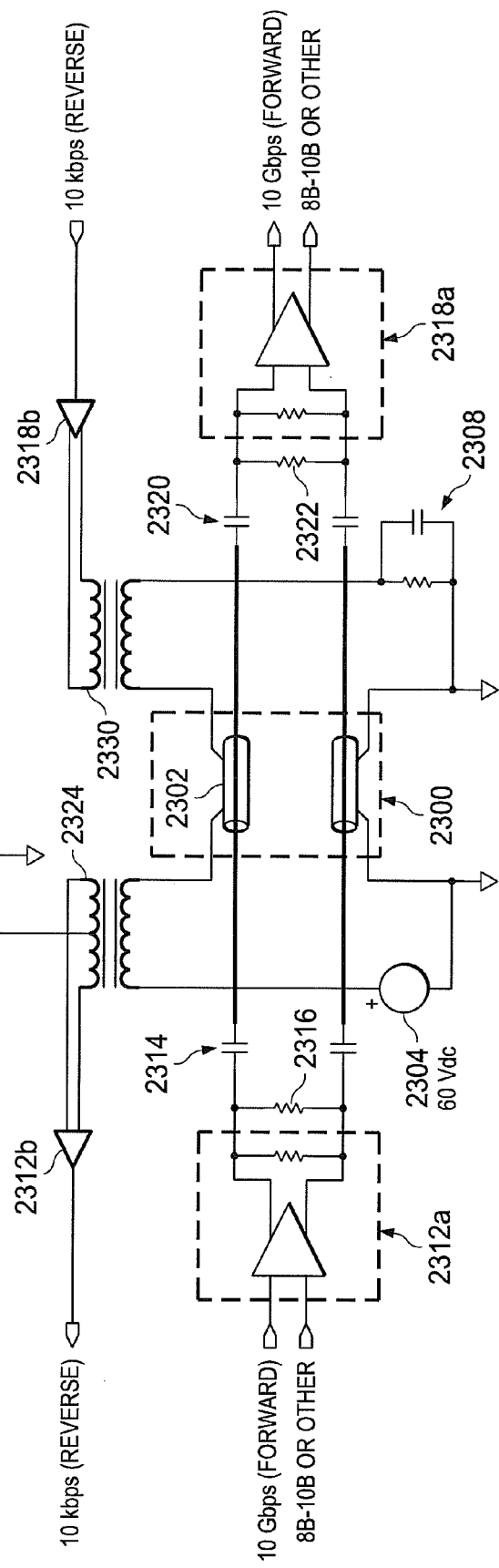

FIGS. 21 through 23 illustrate additional example powering and powered devices in an audio/video system according to this disclosure. As shown in FIG. 21, a cable 2100 includes four conductors 2102, such as is shown in FIGS. 16A through 16C. At one end, forward driving circuitry 2112a is coupled to a transformer 2124, and reverse driving circuitry 2112b is coupled to the same transformer 2124. The transformer 2124 is coupled to the conductors 2102 and to a voltage source 2104 via capacitors 2114. At the other end, forward driving circuitry 2118a is coupled to a transformer 2130, and reverse driving circuitry 2118b is coupled to the same transformer 2130. The transformer 2130 is coupled to the conductors 2102 and to a load 2108 via capacitors 2120.

In particular embodiments, the forward driving circuitries 2112a, 2118a represent DS100BR410 active low-power quad-channel repeaters with 10.3125 Gbps equalizers and de-emphasis drivers from TEXAS INSTRUMENTS INC. Also, the transformers 2124, 2130 have a 5:3 ratio, and the reverse driving circuitries 2112b, 2118b output Manchester II bi-phase encoded data. In addition, the system could support the transport of about 100 W of power and about 10 Gbps in the forward direction and about 1 Mbps in the reverse direction.

As shown in FIG. 22, a cable 2200 includes four conductors 2202. A voltage source 2204 provides power to a load 2208 over the conductors 2202. At one end, outputs of forward driving circuitry 2212a and a reverse channel are coupled to capacitors 2214, and one of the capacitors 2214 is coupled to a resistor 2216. At the other end, inputs of forward driving circuitry 2218a and the reverse channel are coupled to capacitors 2220, and one of the capacitors 2220 is coupled to a resistor 2222. The resistor 2222 is coupled to a voltage source 2250.

In particular embodiments, the forward driving circuitries 2212a, 2218a represent DS100BR410 channel repeaters from TEXAS INSTRUMENTS INC. Also, the system could support the transport of about 100 W of power and about 10 Gbps in the forward direction and about 10 kbps in the reverse direction.

As shown in FIG. 23, a cable 2300 includes four conductors 2302. A voltage source 2304 provides power to a load 2308 over the conductors 2302. At one end, outputs of forward driving circuitry 2312a are coupled to a resistor 2316 and to the conductors 2302 via capacitors 2314, and inputs of reverse driving circuitry 2312b are coupled to the conductors 2302 via a transformer 2324. The transformer 2324 is also coupled to a voltage source 2350. At the other end, inputs of forward driving circuitry 2318a are coupled to a resistor 2322 and to the conductors 2302 via capacitors 2320, and outputs of reverse driving circuitry 2318b are coupled to the conductors 2302 via a transformer 2330.

In particular embodiments, the forward driving circuitries 2312a, 2318a represent DS100BR410 channel repeaters from TEXAS INSTRUMENTS INC. Also, the system could support the transport of about 100 W of power and about 10 Gbps in the forward direction and about 10 kbps in the reverse direction.

Although FIGS. 21 through 23 illustrate additional examples of powering and powered devices in an audio/video system, various changes may be made to FIGS. 21 through 23. For example, each element in these figures can be implemented using any suitable structure for performing the described function(s). Also, the features shown in one or more of the figures of the powering and powered devices could be used in any other of the figures of the powering and powered devices.

Note that in these embodiments, the audio/video content transported over a cable (along with power) can represent substantially "real-time" audio/video data. In other words, the audio/video content being transported is intended for real-time or substantially real-time presentation to a listener or viewer. This is in contrast to, for example, audio/video content transported to an APPLE IPOD or other media player for storage and later playback.

It may be advantageous to set forth definitions of certain words and phrases that have been used within this patent document. The phrase "audio/video" encompasses only audio, only video, or both. The term "couple" and its derivatives refer to any direct or indirect communication between components, whether or not those components are in physical contact with each other. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   transporting audio/video data, using at least one signal line in a single removable cable, from a first audio/video device to a second audio/video device; and
   concurrently transporting from the first audio/video device connected to a power supply to the second audio/video device not connect to the power supply, at least 100 W of power for operating the second audio/video device using at least one electrical conductor in the single removable cable, the first audio/video device and the second audio/video device coupled to the single removable cable.

2. The method of claim 1, wherein:
   the single removable cable comprises multiple electrical conductors; and
   the at least one signal line in the single removable cable comprises one or more of the electrical conductors in the single removable cable.

3. The method of claim 2, wherein the data and the power are transported using at least one common electrical conductor in the single removable cable.

4. The method of claim 2, wherein the single removable cable comprises multiple coaxial conductive pairs, each coaxial conductive pair comprising an axial first conductor and a second conductor around the first conductor.

5. The method of claim 2, wherein the single removable cable comprises an axial first conductor, a second conductor around the first conductor, and a third conductor around the second conductor.

6. The method of claim 1, wherein the at least one signal line comprises at least one optical fiber.

7. The method of claim 1, where the audio/video device comprises at least one of:
   a display unit of a television,
   a DVD player,
   a game console,
   a single removable single removable cable box,
   a digital video recorder,
   a networked media player, and
   an audio receiver.

8. The method of claim 1, wherein:
   the audio/video data has a data rate of at least about 7 Gbps; and
   the power comprises at least 200 W of power.

9. An apparatus comprising:
   a cable transceiver configured to transmit or receive audio/video data using at least one signal line in a single removable cable, wherein the single removable cable connects a first audio/video device to a second audio/video device; and
   a voltage source configured to concurrently provide at least 100 W of power for operating the second audio/video device using at least one electrical conductor in the single removable cable.

10. The apparatus of claim 9, further comprising:
    a serializer-deserializer configured to serialize data for transmission using the single removable cable and to deserialize data received using the single removable cable.

11. The apparatus of claim 9, wherein the single removable cable transceiver is configured to transmit or receive the audio/video data using at least one different electrical conductor than the power in the single removable cable.

12. The apparatus of claim 9, wherein the single removable cable transceiver and the voltage source are configured to transmit or receive the audio/video data and to provide the power using multiple common electrical conductors in the single removable cable.

13. The apparatus of claim 9, wherein the single removable cable transceiver and the voltage source are configured to transmit or receive the audio/video data and to provide the power over a High-Definition Multimedia Interface (HDMI) single removable cable.

14. The apparatus of claim 9, further comprising:
    a Universal Serial Bus (USB) transceiver configured to communicate over a USB bus;
    wherein the single removable cable transceiver is further configured to transmit or receive USB data over the single removable cable concurrently with the power and the audio/video data.

15. The apparatus of claim 9, wherein:
    the single removable cable transceiver is configured to transmit or receive the audio/video data at a data rate of at least about 7 Gbps; and
    the voltage source is configured to provide at least 200 W of power.

16. A single removable cable comprising:
    at least one signal line configured to transport audio/video data over the single removable cable, from a first audio/video device to a second audio/video device; wherein the single removable cable connects the first audio/video device to the second audio/video device; and
    at least one electrical conductor configured to transport at least 100 W of power for operating the second audio/video device over the single removable cable.

17. The single removable cable of claim 16, wherein:
    the single removable cable comprises multiple electrical conductors; and
    the at least one signal line in the single removable cable comprises one or more of the electrical conductors.

18. The single removable cable of claim 17, wherein the single removable cable is configured to transport the data and the power over at least one common electrical conductor.

19. The single removable cable of claim 17, wherein the single removable cable comprises multiple coaxial conductive pairs, each coaxial conductive pair comprising an axial first conductor and a second conductor around the first conductor.

20. The single removable cable of claim 17, wherein the single removable cable comprises an axial first conductor, a second conductor around the first conductor, and a third conductor around the second conductor.

\* \* \* \* \*